United States Patent
Wilhelm et al.

(10) Patent No.: US 9,096,156 B2
(45) Date of Patent: Aug. 4, 2015

(54) VEHICLE SEAT, IN PARTICULAR UTILITY VEHICLE SEAT

(75) Inventors: Wolfgang Wilhelm, Heddesheim (DE); Uwe Reichel, Kottweiler-Schwanden (DE)

(73) Assignee: Keiper GMBH & Co. KG, Kaiserslautern (DE)

( * ) Notice: Subject to any disclaimer, the term of this patent is extended or adjusted under 35 U.S.C. 154(b) by 189 days.

(21) Appl. No.: 13/821,958

(22) PCT Filed: Aug. 26, 2011

(86) PCT No.: PCT/EP2011/004301
§ 371 (c)(1),
(2), (4) Date: Jul. 26, 2013

(87) PCT Pub. No.: WO2012/038019
PCT Pub. Date: Mar. 29, 2012

(65) Prior Publication Data
US 2013/0292983 A1      Nov. 7, 2013

(30) Foreign Application Priority Data
Sep. 20, 2010   (DE) .......................... 10 2010 046 489

(51) Int. Cl.
*F16F 9/43* (2006.01)
*B60N 2/50* (2006.01)
*B60N 2/52* (2006.01)

(52) U.S. Cl.
CPC ................ *B60N 2/501* (2013.01); *B60N 2/502* (2013.01); *B60N 2/505* (2013.01); *B60N 2/508* (2013.01); *B60N 2/525* (2013.01); *F16F 9/43* (2013.01)

(58) Field of Classification Search
CPC ........ B60N 2/501; B60N 2/502; B60N 2/505; B60N 2/508; B60N 2/525
USPC ............ 267/64.11, 131; 297/344.12, 344.15, 297/344.16; 248/550, 564, 588
See application file for complete search history.

(56) References Cited

U.S. PATENT DOCUMENTS

| 4,213,594 A | 7/1980 | Pietsch et al. |
| 4,645,169 A | 2/1987 | Mischer |

(Continued)

FOREIGN PATENT DOCUMENTS

| CN | 1680138 A | 10/2005 |
| CN | 1735524 A | 2/2006 |

(Continued)

OTHER PUBLICATIONS

International Search Report for application No. PCT/EP2011/004301 mailed Oct. 6, 2011.

(Continued)

*Primary Examiner* — Thomas J Williams
(74) *Attorney, Agent, or Firm* — Fletcher Yoder, P.C.

(57) ABSTRACT

A vehicle seat has a scissor-type stand vibratable and adjustable in height, with a pneumatic spring and cranks intersecting at a scissor shaft, and a control device for level control and height adjustment of the stand. The control device has a driver, a switching element coupled with the driver, and a valve device controlled by the switching element, for controlling the pneumatic spring. The driver and the valve device are kinematically assigned to different parts of the stand, such parts being movable relative to one another. The switching element is spaced from the shaft and rotatably supported on the first crank. The valve device is connected with the first crank, and the driver is configured as a Bowden cable, the core of which is coupled with the switching element, and the jacket of which is fixedly connected with the second crank.

8 Claims, 6 Drawing Sheets

(56) References Cited

U.S. PATENT DOCUMENTS

| | | | |
|---|---|---|---|
| 4,946,145 A | 8/1990 | Kurabe | |
| 5,058,852 A * | 10/1991 | Meier et al. | 248/588 |
| 5,533,703 A | 7/1996 | Grassl et al. | |
| 5,735,509 A | 4/1998 | Gryp et al. | |
| 6,616,116 B1 | 9/2003 | Rochau et al. | |
| 7,712,836 B2 | 5/2010 | Deml | |
| 2008/0088165 A1 | 4/2008 | Deml | |
| 2013/0140865 A1 * | 6/2013 | Shin | 297/344.12 |

FOREIGN PATENT DOCUMENTS

| | | |
|---|---|---|
| CN | 101054069 A | 10/2007 |
| DE | 2849700 A1 | 5/1980 |
| DE | 3333604 A1 | 3/1985 |
| DE | 4335199 C1 | 5/1995 |
| DE | 19915138 A1 | 9/2000 |
| DE | 102006017774 A1 | 10/2007 |
| EP | 2098407 A2 | 9/2009 |
| GB | 2309894 A | 8/1997 |

OTHER PUBLICATIONS

Chinese office action dated Jun. 27, 2014.

PCT Notification of Transmittal of Copies of Translation of the International Preliminary Report on Patentability mailed Apr. 4, 2013.

* cited by examiner

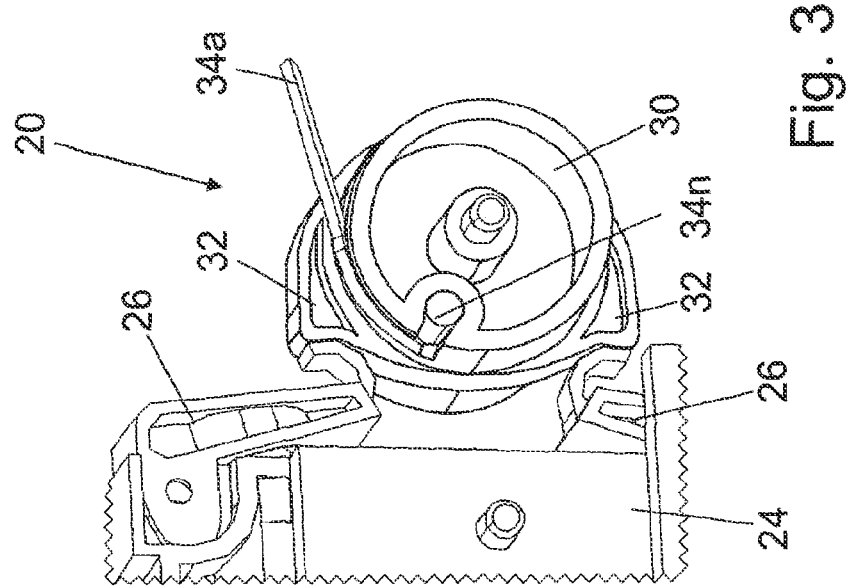
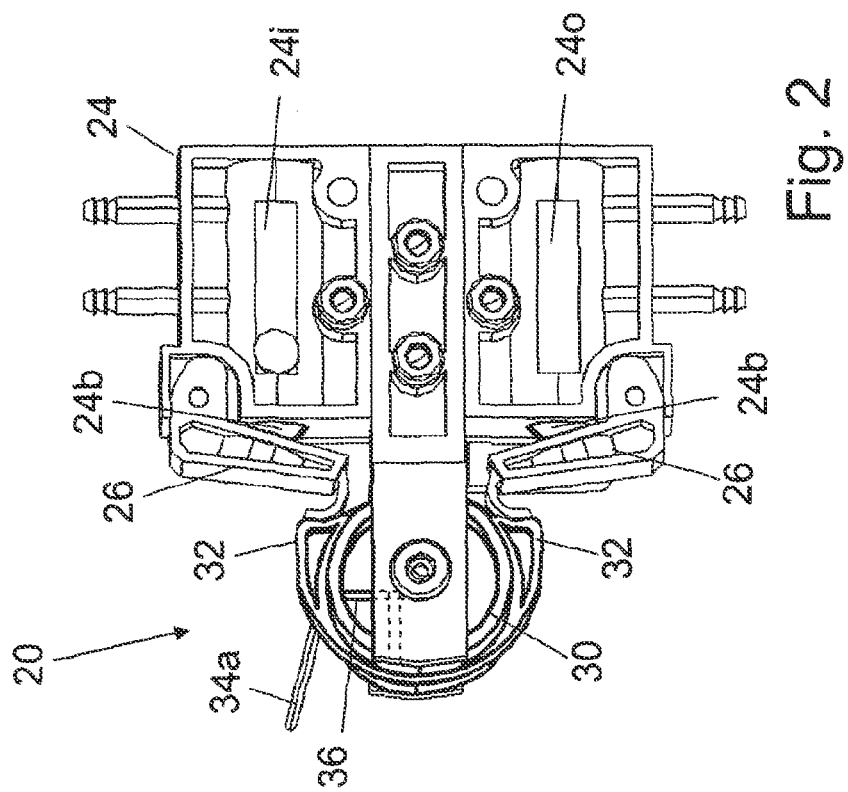

VEHICLE SEAT, IN PARTICULAR UTILITY VEHICLE SEAT

CROSS REFERENCE TO RELATED APPLICATIONS

This application claims priority from and the benefit of PCT Application No. PCT/EP2011/004301, filed on Aug. 26, 2011; and German Patent DE 10 2010 046 489.9, filed on Sep. 20, 2010; which are herein incorporated by reference.

BACKGROUND

The invention relates to a vehicle seat, in particular a utility vehicle seat, having a scissor-type stand, which is able to vibrate and which can be adjusted in terms of height, with a pneumatic spring and at least first and second cranks, which intersect at a scissor shaft, and a control device for level control and for height adjustment of the scissor-type stand, the control device including a driver, a switching element coupled with the driver, and a valve device which is controllable by the switching element to control the pneumatic spring, wherein the driver and the valve device are kinematically assigned to different parts of the scissor-type stand, the different parts being movable relative to one another.

DE 28 49 700 A1, DE 33 33 604 A1, DE 43 35 199 C1, U.S. Pat. No. 4,946,145 A or DE 10 2006 017 774 A1 describe known vehicle seats of this kind. There is provided in each case for the level control a control circuit which comprises the scissor-type stand, the pneumatic spring and the control device including driver, switching element and valve device. The driver and the valve device are arranged on parts of the vehicle seat which are movable relative to one another. If the actual value of height deviates from the desired value, generally owing to a deflection of the stand, the pneumatic spring is controlled in such a manner that it acts counter to the deflection, and the actual value again reaches the desired value. For the height adjustment, the desired value is modified in accordance with the height which is to be newly adjusted, so that the level control treats the current actual value as a deviation from the desired value and moves the scissor-type stand to the desired new height. In the case of technical implementation, known vehicle seats have a partially complex structure. In addition, an increase in the precision of the level control and of the height adjustment would also be desirable.

SUMMARY

The object of the invention is to improve a vehicle seat of the type mentioned in the introduction. This object is achieved according to the invention with a vehicle seat having a scissor-type stand, which is able to vibrate and which can be adjusted in terms of height, with a pneumatic spring and at least first and second cranks, which intersect at a scissor shaft, and a control device for level control and for height adjustment of the scissor-type stand, the control device including a driver, a switching element coupled with the driver, and a valve device which is controllable by the switching element to control the pneumatic spring, wherein the driver and the valve device are kinematically assigned to different parts of the scissor-type stand, the different parts being movable relative to one another.

The kinematic assignment of the rotatable switching element and of the valve device to the first crank makes possible both, a pre-assembled and optionally testable assembly, as well as an arrangement at a site which is suitable with respect to the available building space and spaced apart from the scissor shaft. The configuration of the driver as a Bowden cable makes possible both, a simple kinematic assignment of the driver to the second crank, by the jacket being tightly connected with the second crank, and a simple adjustment of the driver, for a modification of the desired value of height, leading to height adjustment by means of level control.

Compared to other possible assignments to parts of the scissor-type stand, for example to the frames, the kinematic assignment according to the invention increases the detectable deflection of the vibration of the scissor-type stand and thus the measuring accuracy of the actual value of height, what ultimately improves both, level control and height adjustment. Kinematic assignment intends that the components which are kinematically assigned to one another move together, i.e. that they form a kinematic unit or assembly, what can be reached by fixed connections or by force-closed couplings.

DRAWINGS

The invention is explained in greater detail below with reference to an exemplary embodiment and a modification illustrated in the drawing, in which:

FIG. 2 shows a view of the valve device and of the switching element,

FIG. 3 shows a partial view of the valve device and of the switching element,

Figure 7:
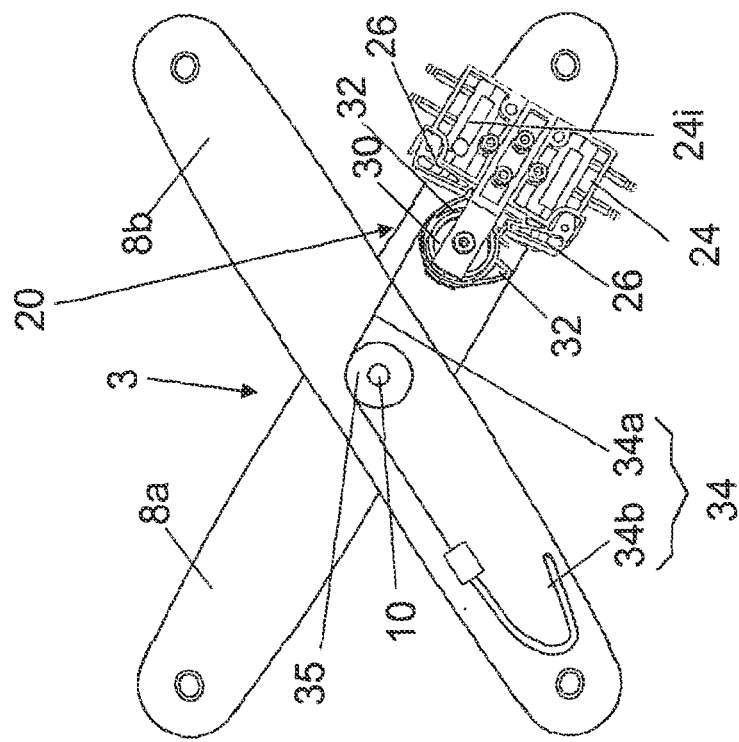
Figure 6:
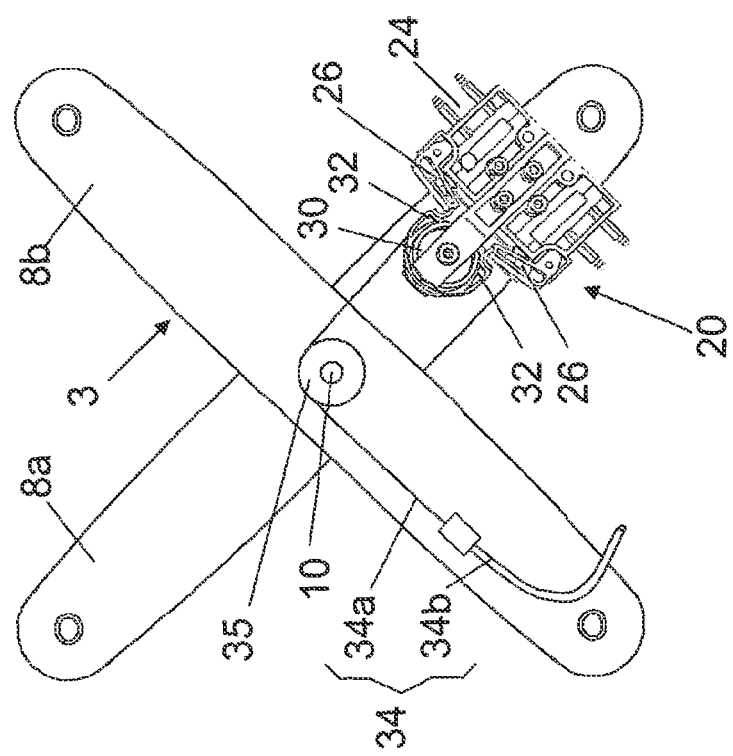
Figure 8:
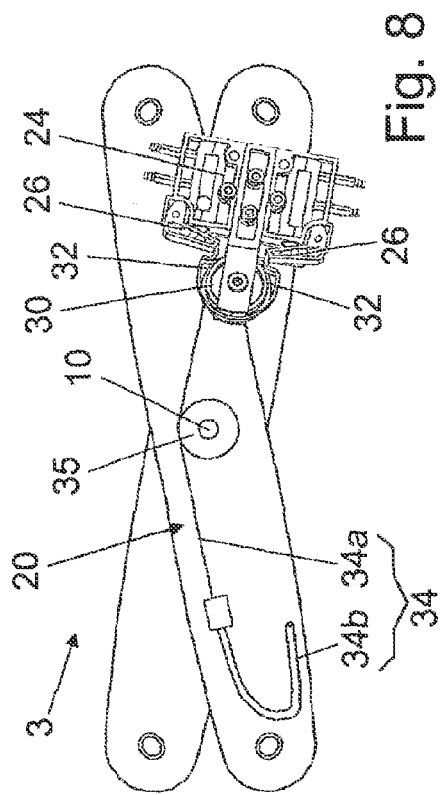
Figure 9:
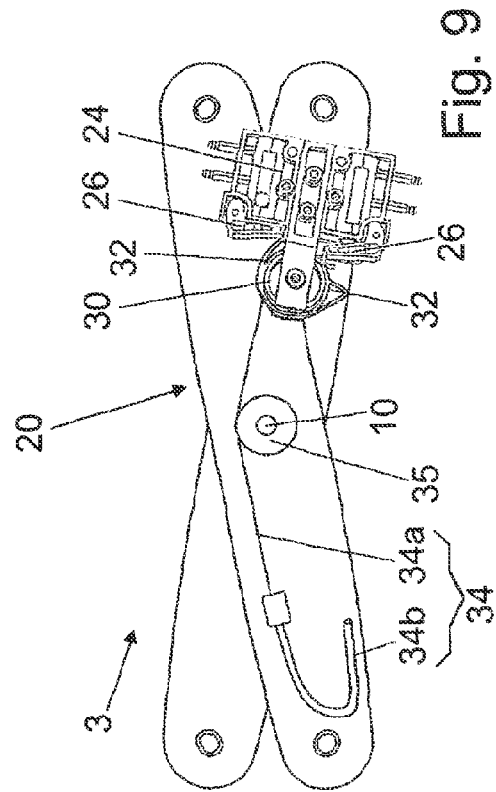
Figure 10:
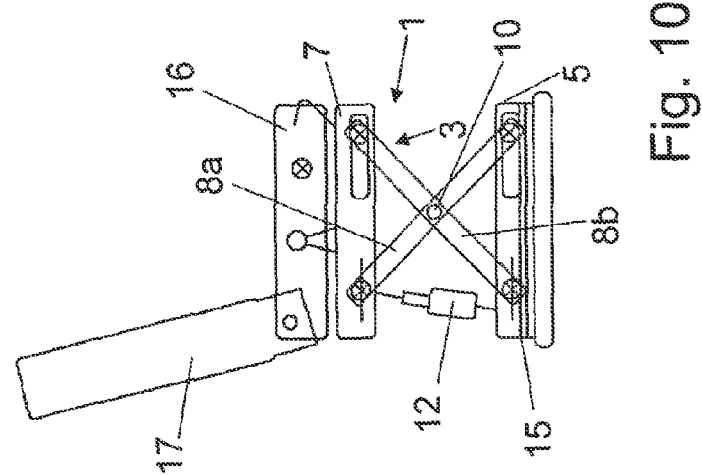
Figure 11:
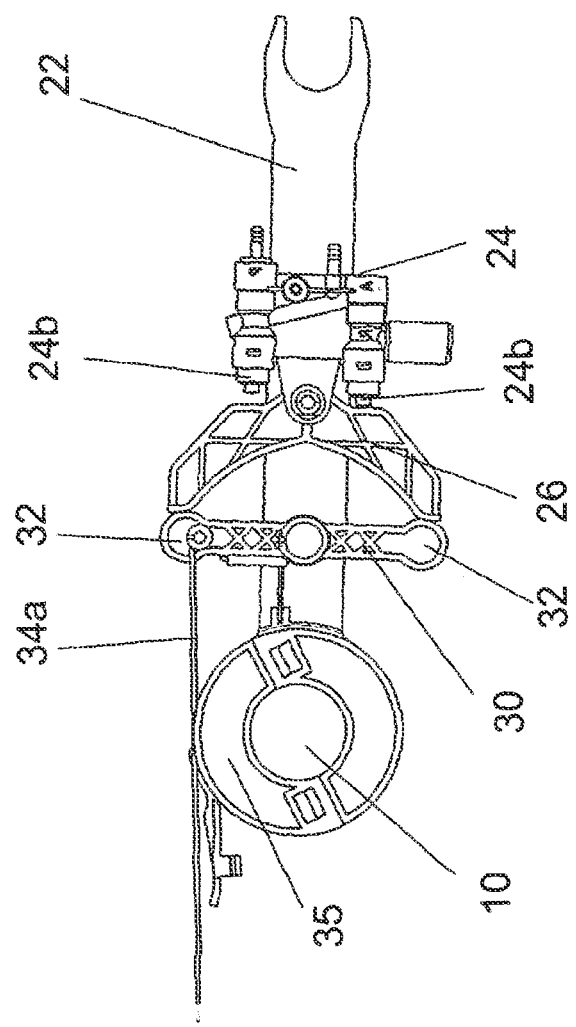

FIG. 6 shows a schematic side view of the scissor-type stand in an upper vertical position, FIG. 7 shows a side view corresponding to FIG. 6, after a deflection of the scissor-type stand downward, FIG. 8 shows a schematic side view of the scissor-type stand in a lower vertical position, FIG. 9 shows a side view corresponding to FIG. 8, after an actuation and rotation of the switching element, FIG. 10 shows a schematic side view of a vehicle seat, and FIG. 11 shows a side view of a control device according to a modification.

DETAILED DESCRIPTION

A vehicle seat 1 (FIG. 10) for a utility vehicle or another motor vehicle has a scissor-type stand 3 which comprises a lower frame 5, an upper frame 7 which is arranged thereabove and at each of the two sides a pair of intersecting cranks 8a and 8b, respectively. A scissor shaft 10 connects the two intersection points and at the same time defines the axis about which the cranks 8a and 8b can pivot relative to each other. The cranks 8a and 8b are in each case articulated at the rear end thereof to the lower frame 5 or to the upper frame 7 respectively and in each case have at the front end thereof rotatable pulleys, by means of which they are guided in or on the upper frame 7 and/or lower frame 5 so as to be able to be moved in the longitudinal direction of the seat. Owing to this movement of the cranks 8a and 8b, the height of the upper frame 7 above the lower frame 5 changes, hereinafter briefly referred to as the height of the scissor-type stand 3. Using a pneumatic spring 12 and preferably a damping device, the scissor-type stand 3 becomes a system which is able to vibrate and increases the seat comfort.

Figure 1:
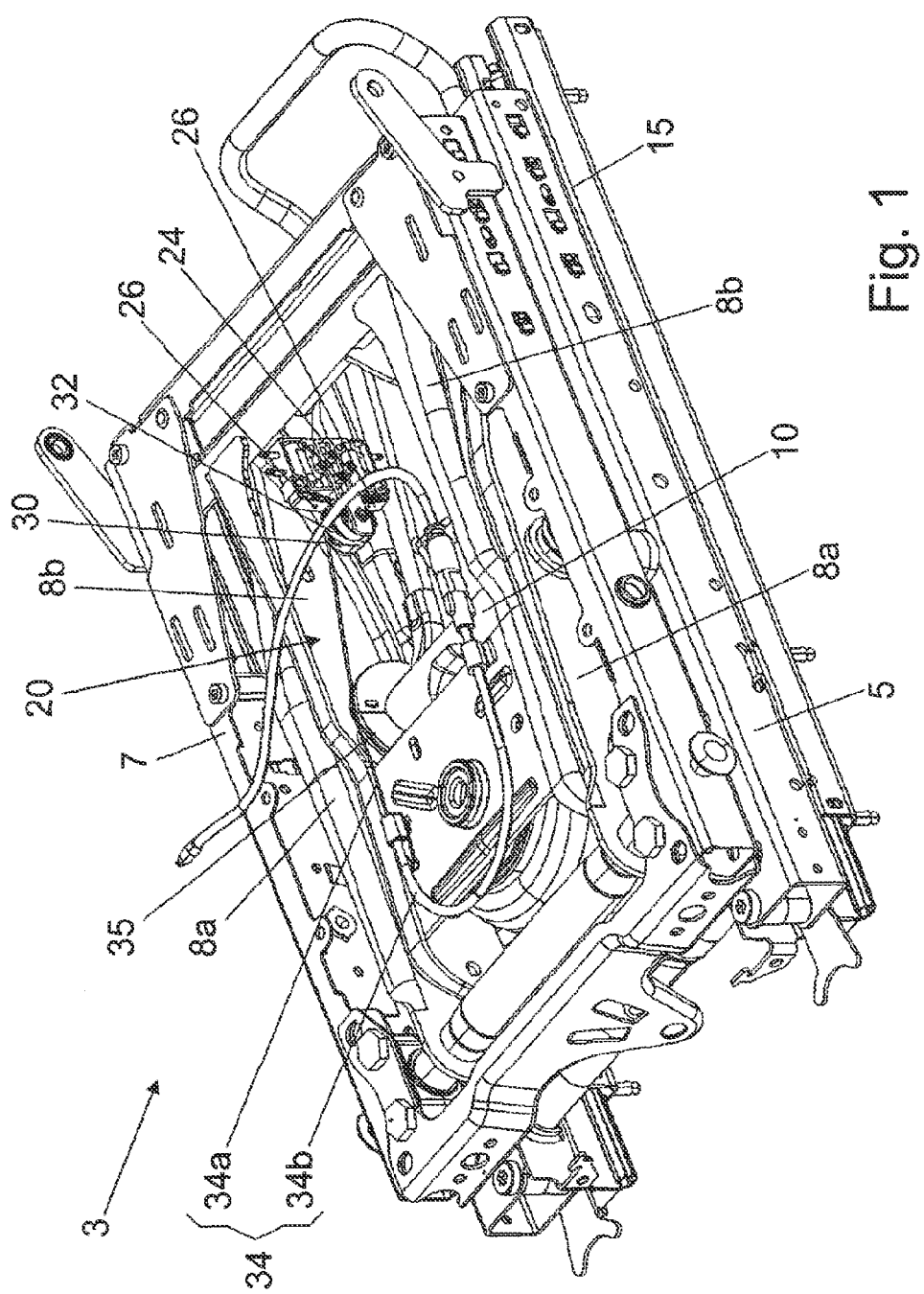
FIG. 1 shows a perspective view of a scissor-type stand with a control device.
Figure 5:
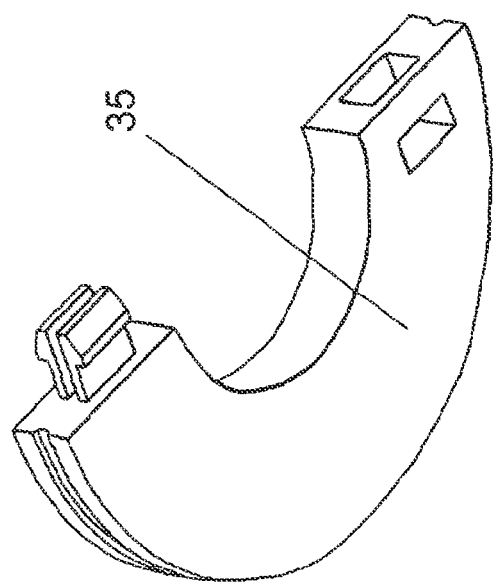
FIG. 5 shows a perspective view of part of the deflection pulley.

In the present case, the scissor-type stand 3 (FIG. 1) can be displaced in the longitudinal direction of the seat by means of seat rails 15, as a result of which the vehicle seat 1 is longitudinally adjustable, that is to say, the longitudinal position of its seat can be adjusted. The vehicle seat 1 further has a seat frame 16 which is articulated on the one hand at the rear region thereof to the upper frame 7 at both sides and, on the other hand, can be raised and lowered in the front region thereof by means of an inclination adjustment device and can consequently be adjusted in terms of inclination relative to the scissor-type stand 3. The vehicle seat 1 also has a backrest 17 which is fitted to the seat frame 16 (or alternatively to the upper frame 7), —in the present case so as to be able to be adjusted in terms of inclination.

The two pairs of intersecting cranks 8a and 8b each comprise a first crank 8a which is arranged at the outer side and a second crank 8b which is arranged at the inner side. The first two cranks 8a are connected to each other at the ends thereof by means of transverse pipes. The second two cranks 8b, too, are connected to each other at the ends thereof by means of transverse pipes and, in the center thereof, by means of the scissor shaft 10 which is configured as a pipe as well. The transverse pipes which are at the front in each case support the pulleys. In the exemplary embodiment, the two second cranks 8b are additionally connected by means of a transverse metal sheet which is arranged spaced apart from the scissor shaft 10 and from the lower transverse pipe.

A control device 20 serves for both, level control, i.e. maintaining the adjusted height of the scissor-type stand 3 during vehicle operation, and for height adjustment of the scissor-type stand 3.

Figure 4:
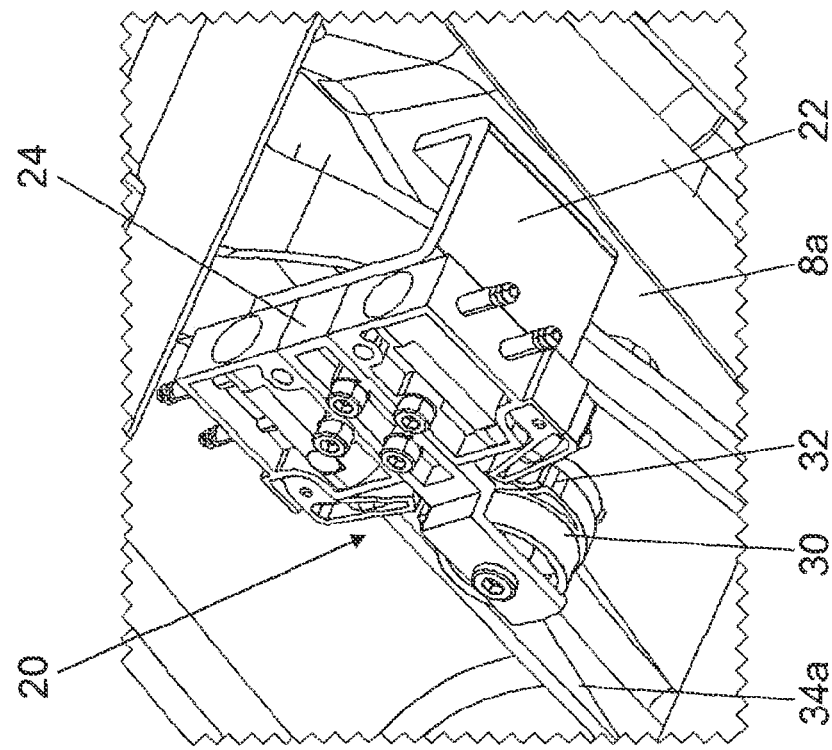
FIG. 4 shows a perspective partial view of the scissor-type stand.

The control device 20 has a base 22 which is fixedly connected with the first cranks 8a. The base 22 can be configured in one part or in multiple parts. The shape of the base 22 is tailored to the concrete application, for example by the base 22 being angled—where necessary several times—for example in order to protrude from the first cranks 8a, which are arranged outside, into the area between the two second cranks 8b. In the present case, the base 22 is fixed to the first crank 8a which is on the left side in the direction of travel, on the inside thereof, and namely spaced apart from the scissor shaft 10, at a site which is still below the second crank 8b, even in the lowest vertical position of the scissor-type stand 3, namely in the vicinity of the lower front end of the first crank 8a (FIG. 4). Alternatively, the base 22 is fixed to the lower transverse pipe, between the first two cranks 8a. The base 22 protrudes inside, so that its free end is arranged in the transverse direction of the seat between the two second cranks 8b.

To the base 22 (FIG. 2), a valve device 24 is fixed, which is provided with two valves for controlling the pneumatic spring 12, namely an inlet valve 24i and an outlet valve 24o. So-called seated-type valves or slider valves can be considered as valve types. The inlet valve 24i and the outlet valve 24o can each have two valve connections (one to the pneumatic spring 12 and the other one to the compressed air and/or for blowing off), as shown in FIGS. 1 to 9. Alternatively, the inlet valve 24i and the outlet 24o are connected to form one unit, so that only three connections (pneumatic spring 12, compressed air, blowing off) are available, as shown in FIG. 11.

For each of the two valves a movable tappet 24b protrudes from the housing of the valve device 24. By acting upon the tappet 24b, the assigned valve can be actuated. The valve device has at least one control lever 26 for acting upon the tappets 24b, said control lever being pivotably articulated on the housing of the valve device 24 or on the base 22. In the exemplary embodiment (FIGS. 1 to 10), exactly one control lever 26 is provided for each tappet 24b. In a modification (FIG. 11) one single control lever 26 is provided, which, in the form of a rocker or or a butterfly, can act upon both tappets 24b alternatively.

For controlling the control levers 26, i.e. for pivoting then and thus acting upon the tappets 24b, the control device 20 has a switching element 30, which is pivotably mounted on the base 22 or on the housing (or a bracket) of the valve device 24, about an axis of rotation which is offset in parallel to the scissor shaft 10 (FIG. 2). The switching element 30 has a disc-shaped basic body and two control cams 32. The control cams 32 can be formed in one piece with the basic body of the switching element 30 or be configured separately and fixed to the basic body of the switching element 30. The control cams 32 in the present case are provided radially outside on the switching element 30, but they can, for example, also protrude in parallel to the axis of rotation of the switching element 30, from the front end thereof. For controlling the control levers 26, the switching element 30 can be rotated. By means of the rotation of the switching element 30, each time exactly one of the control cams 32—depending on the sense of rotation—acts upon exactly one of two control levers 26 (if two control levers 26 are provided), or a slot section of the single control lever 26 (if one control lever 26 is provided). If the control cam 32 acts upon the control lever 26, the latter acts upon the tappet 24b, and namely (at least approximately) free of transverse force, i.e. without tangential component with reference to the switching element 30. The control lever 26 could have, at its free end, a spring arm which is continuously in contact with the assigned control cam 32, but without the control lever 26 which is adjoining the valve tappet 24b without being acted upon, being pivoted. Alternatively, the control lever 26 is arranged at a distance from the valve tappet 24b. The assembly with the base 22 (or a part of the base 22), the valve device 24 and the switching element 30 is preferably pre-assembled and optionally is a testable unit.

The control device 20 further is provided with a driver 34 which is configured as a Bowden cable, having a core 34a and a jacket 34b. The jacket 34b is fixedly connected with the second cranks 8b, in the exemplary embodiment it is supported and clamped to the transverse metal sheet between the two second cranks 8b. The core 34a is connected at one end with an actuating element (not illustrated) for the control device 20, said actuating element being arranged in the area of the seat frame 16 or of the upper frame 7. Towards the other end, the core 34a, after leaving the jacket 34b, is guided over a deflection pulley 35 which is rotatably supported on the scissor shaft 10 and guided further to the switching element 30, which is (directly) coupled with the core 34a. The outer diameter of the deflection pulley 35 preferably corresponds at least approximately to that of the disc-shaped basic body of the switching element 30, so that the core 34a gets at least approximately tangentially to the switching element 30. The deflection pulley 35 can be assembled from to semi-arc-shaped parts (FIG. 5), which together enclose the scissor shaft 10. These two semi-arc-shaped parts can, for example, be clipped with each other.

For coupling the switching element 30 with the core 34a of the driver 34, the core 34a can be fixed to the switching element 30 (like in the exemplary embodiment), for example by the (in the present case barrel-shaped) nipple 34n engaging at the same end of the core 34a in a suitable receptacle of the switching element 30 (FIG. 3). Alternatively, the coupling of the switching element 30 with the core 34a can be configured with a free travel to be coupled by driving, for example by the nipple 34n being guided at the same end of the core 34a in an (arc-shaped) oblong hole of the switching element 30. The nipple 34n can be kept in the center of the oblong hole by elastic elements. Smaller deflections thus have no effect on the level control (which consequently shows a hysteresis). Preferably, the core 34a is, before its end which is fixed to the switching element 30, wound a little (in the circumferential direction) around the switching element 30 for example located axially next to one of the control cams 32 and in an annular groove of the switching element 30.

In its non-actuated state, the actuating element fixes the driver 34, i.e. it keeps the core 34a on the one hand and the jacket 34b (and the second crank 8b) on the other hand in a fixed relative position to each other. The length of the part of the core 34a which protrudes over the jacket 34b, hereinafter shortly referred to as protrusion length, has a certain value. In the exemplary embodiment, a reset spring 36 is arranged on the switching element 30, for example a spiral spring, a leg spring or a tension spring. The reset spring 36 is effective between the switching element 30 on the one hand and, on the other hand, at least indirectly the first crank 8a, preferably the base 20. The reset spring 36 acts upon the switching element 30 in the sense of rotation which acts against a torque due to a tension force in the core 34a. The reset spring 36 thus holds the core 34a tight relative to the jacket 34b. In the event of an actuation, the actuating element displaces the core 34a relative to the jacket 34b, the protrusion length of the core 34a thus changing.

Of the two functions of the control device 20, level control during use of the vehicle seat 1 acts as follows: In an initial position, the scissor-type stand 3 is adjusted at a certain height, for example in an upper position (FIG. 6). Deflections of the scissor-type stand 3, which is able to vibrate, for example owing to an unevenness in the road surface, lead to the cranks 8a and 8b pivoting relative to each other. Since the protrusion length of the core 34a is maintained by means of the driver 34 relative to the second cranks 8b, the switching element 30 which is coupled to the core 34a rotates relative to the first cranks 8a and thus to the valve device 24 with the control levers 26. Depending on the direction of deflection of the scissor-type stand 3 and consequently on the sense of rotation of the switching element 30—one of the two control cams 32 thus acts upon the assigned control lever 25, the latter then actuating the assigned tappet 24b of the valve device 24 (FIG. 7). Depending on the direction of deflection, the pneumatic spring 12 is either aerated by means of the inlet valve 24i (in the case of a deflection downward, as in FIG. 7) or it is deaerated by means of the outlet valve 24o (in the case of a deflection upward). This acts counter to the deflection then. The cranks 8a and 8b, the control device 20 and the pneumatic spring 12 form a control circuit, which controls the scissor-type stand 3 to the adjusted height as desired value.

The other function of the control device 20, i.e. height adjustment, acts as follows: In an initial position, the scissor-type stand 3 is adjusted at a certain height, for example in a lower position (FIG. 8). An actuation of the actuating element of the control device 20 displaces at the driver 34 the core 3a relative to the jacket 34b. In the event of a tension, the protrusion length of the core 34a gets shorter, in the event of an extension, the reset spring 36 extends the protrusion length of the core 34a. The core 34a thus rotates the switching element 30, one of the two control cams 32 thus acts upon the assigned control lever 26 (FIG. 9). This has the same effect as if the cranks 8a and 8b pivoted relative to one another, i.e. the valve device 24 is actuated, in order to counteract the supposed deflection. A shortening of the protrusion length causes an actuation of the outlet valve 24o (for a height adjustment downward), an extension of the protrusion length (FIG. 9) causes an actuation of the inlet valve 24i (for a height adjustment upward). The control circuit now controls to the newly adjusted height as desired value, so that the scissor-type stand 3 for example gets into an upper position (FIG. 6).

The invention claimed is:

1. A utility vehicle seat, comprising:
    a) a scissor-type stand, which is able to vibrate and which can be adjusted in terms of height, with a pneumatic spring and at least first and second cranks, which intersect at a scissor shaft; and
    b) a control device for level control and for height adjustment of the scissor-type stand, the control device comprising a driver, a switching element coupled with the driver, and a valve device which is controllable by the switching element to control the pneumatic spring, wherein the driver and the valve device are kinematically assigned to different parts of the scissor-type stand, the different parts being movable relative to one another;
    wherein the switching element is spaced apart from the scissor shaft and rotatably supported on the first crank;
    wherein the valve device is fixedly connected with the first cranky;
    wherein the driver is configured as a Bowden cable having a core coupled with the switching element, and a jacket fixedly connected with the second crank; and
    wherein the switching element has at least one control cam which controls the valve device in the event of a rotation of the switching element, and the at least one control cam, in the event of the rotation of the switching element acts upon a control lever which is pivotally articulated on the valve device or on a base of the control device.

2. The utility vehicle seat according to claim 1, wherein the base of the control device is fixed to the first crank, and wherein the valve device is fixed to and/or the switching element is rotatably mounted on the base.

3. The utility vehicle seat according to claim 1, wherein the control lever, due to its being acted upon, acts upon a tappet of a valve of the valve device.

4. The utility vehicle seat according to claim 1, wherein a reset spring is effective between the switching element and at least indirectly the first crank to maintain the core of the driver tight relative to the jacket.

5. The utility vehicle seat according to claim 1, wherein for coupling the switching element with the core of the driver, the switching element is fixed to the core or coupled by driving with a free travel.

6. The utility vehicle seat according to claim 1, comprising an actuating element which, in a non-actuated state, fixes the driver by holding the core relative to the jacket, and which, in the event of an actuation, displaces the core relative to the jacket.

7. The utility vehicle seat according to claim 1, wherein the driver is deflected, at least with the core, on the scissor shaft.

8. The utility vehicle seat according to claim 7, wherein the core of the driver is guided over a deflection pulley which is rotatably supported on the scissor shaft, and wherein the deflection pulley has approximately the same diameter as the switching element and/or comprises two parts clipped together.

* * * * *